US012675556B2

(12) United States Patent
Zhao et al.

(10) Patent No.: US 12,675,556 B2
(45) Date of Patent: Jul. 7, 2026

(54) COMPUTER-IMPLEMENTED METHOD FOR ADAPTIVE DECRYPTION OF AUDIO STREAMS, DEVICE, AND STORAGE MEDIUM

(71) Applicant: Linkplay Technology Inc. Nanjing, Nanjing (CN)

(72) Inventors: Keying Zhao, Nanjing (CN); Qi Wang, Nanjing (CN)

(73) Assignee: Linkplay Technology Inc. Nanjing, Nanjing (CN)

( * ) Notice: Subject to any disclaimer, the term of this patent is extended or adjusted under 35 U.S.C. 154(b) by 0 days.

(21) Appl. No.: 19/166,888

(22) PCT Filed: Apr. 11, 2025

(86) PCT No.: PCT/CN2025/088543
§ 371 (c)(1),
(2) Date: Sep. 19, 2025

(87) PCT Pub. No.: WO2026/051362
PCT Pub. Date: Mar. 12, 2026

(65) Prior Publication Data
US 2026/0113179 A1     Apr. 23, 2026

(30) Foreign Application Priority Data

Sep. 6, 2024     (CN) ......................... 202411248417.X

(51) Int. Cl.
*G06F 21/10* (2013.01)
*G06F 3/16* (2006.01)
*G06F 21/60* (2013.01)
(52) U.S. Cl.
CPC ............ *G06F 21/106* (2023.08); *G06F 3/165* (2013.01); *G06F 21/602* (2013.01)

(58) Field of Classification Search
CPC . G06F 3/165; G06F 21/10–109; G06F 21/602
See application file for complete search history.

(56) References Cited

U.S. PATENT DOCUMENTS

| | | | | | |
|---|---|---|---|---|---|
| 2019/0026444 | A1* | 1/2019 | Yamagishi | ............. | H04H 20/93 |
| 2025/0016205 | A1* | 1/2025 | Mao | .................... | H04L 65/1016 |

FOREIGN PATENT DOCUMENTS

| | | | | | |
|---|---|---|---|---|---|
| CN | 106096334 | A | * 11/2016 | ............. | G06F 21/10 |
| CN | 110446074 | A | 11/2019 | | |

(Continued)

*Primary Examiner* — Kevin Bechtel
(74) *Attorney, Agent, or Firm* — Bayramoglu Law Offices LLC

(57) ABSTRACT

A computer-implemented method for adaptive decryption of audio streams includes acquiring an MPEG-DASH manifest file and parsing the MPEG-DASH manifest file; initializing a standard DRM interface; performing feature extraction on the audio segment information in the identified audio segment mode, and dynamically adjusting segment requests and processing logic for adaptive segment downloading and preprocessing; extracting encryption parameters to identify encryption flags of the target audio stream platform, and selecting, according to the encryption flags, corresponding decryption algorithms to decrypt the current audio segment; and performing audio frame reconstruction on the decrypted data to form an updated audio stream and buffering, based on an adaptive buffering strategy, the updated audio stream in a preset buffer, and outputting a final audio stream to ensure audio stream continuity while achieving efficient parallel processing of decryption and playback, improving decryption efficiency, and enhancing user experience, especially in high concurrency scenarios.

20 Claims, 2 Drawing Sheets

Acquire an MPEG-DASH manifest file and parse the MPEG-DASH manifest file to extract audio segment information for adaptive segment recognition of standard and non-standard audio segment modes Initialize a standard DRM interface and integrate the DRM interface with a target audio stream platform to adapt the MPEG-DASH protocol-based audio stream to the audio segment mode of the target audio stream platform Perform feature extraction on the audio segment information in the identified audio segment mode, and dynamically adjust segment requests and processing logic for adaptive segment downloading and preprocessing Acquire encryption information corresponding to the current audio segment, extract encryption parameters to identify encryption flags of the target audio stream platform, and select, according to the encryption flags, corresponding decryption algorithms to decrypt the current audio segment Perform audio frame reconstruction on the decrypted data to form an updated audio stream to ensure compatibility with an original unencrypted audio stream, and buffer, based on an adaptive buffering strategy, the updated audio stream in a preset buffer, and output a final audio stream to ensure audio stream continuity while achieving efficient parallel processing of decryption and playback

(56)     References Cited

FOREIGN PATENT DOCUMENTS

| CN | 113411638 | A | 9/2021 |
| CN | 117714795 | A | 3/2024 |
| CN | 119337396 | A | 1/2025 |

* cited by examiner

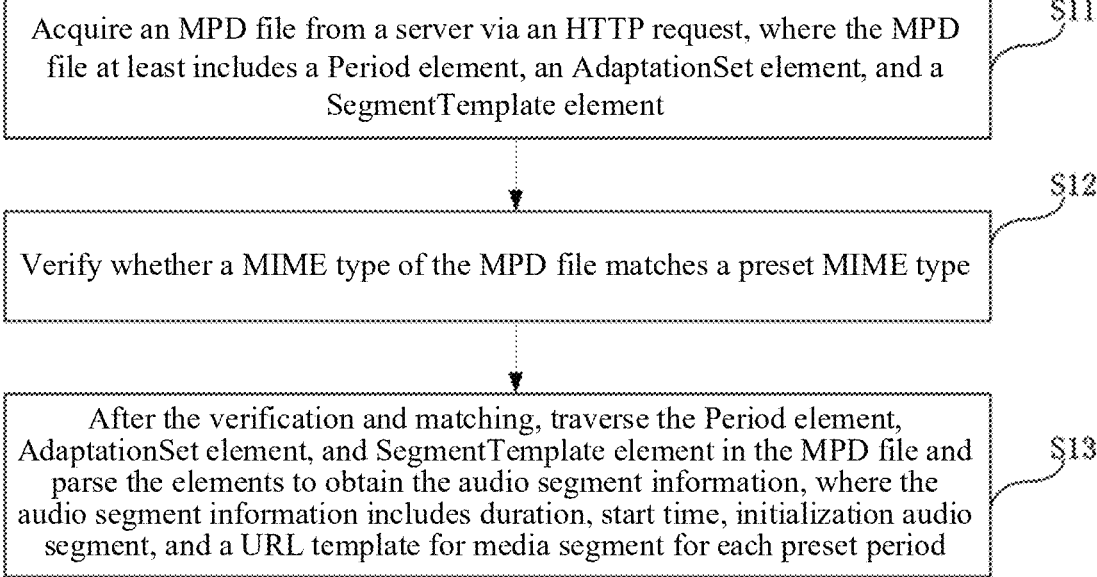

Acquire an MPD file from a server via an HTTP request, where the MPD file at least includes a Period element, an AdaptationSet element, and a SegmentTemplate element    S11

Verify whether a MIME type of the MPD file matches a preset MIME type    S12

After the verification and matching, traverse the Period element, AdaptationSet element, and SegmentTemplate element in the MPD file and parse the elements to obtain the audio segment information, where the audio segment information includes duration, start time, initialization audio segment, and a URL template for media segment for each preset period    S13

FIG. 3

COMPUTER-IMPLEMENTED METHOD FOR ADAPTIVE DECRYPTION OF AUDIO STREAMS, DEVICE, AND STORAGE MEDIUM

CROSS REFERENCE TO THE RELATED APPLICATIONS

This application is the national phase entry of International Application No. PCT/CN2025/088543, filed on Apr. 11, 2025, which is based upon and claims priority to Chinese Patent Application No. 202411248417.X, filed on Sep. 6, 2024, the entire contents of which are incorporated herein by reference.

TECHNICAL FIELD

The present invention relates to the field of audio technology, and more particularly, to a computer-implemented method for adaptive decryption of audio streams, a device, and a storage medium.

BACKGROUND

In the field of digital audio streaming media, Digital Rights Management (DRM) technology is crucial for protecting content copyrights. Existing DRM solutions provide a common protection mechanism for various streaming media services. However, when processing audio streams from specific platforms, the prior art has several shortcomings. Firstly, the special implementation based on the MPEG-DASH protocol results in audio segment modes on certain platforms differing from the standard, making it difficult for existing DRM solutions to be directly applicable. Secondly, the encryption methods used by specific platforms may include non-standard extensions, requiring additional parsing and processing steps. In addition, in high concurrency scenarios, the performance of conventional decryption methods often fails to meet the requirements for real-time playback, leading to a decline in user experience. The prior art also faces security challenges, such as improper key management that may lead to unauthorized access to content. Finally, due to the lack of flexible architectural design, existing solutions are difficult to quickly adapt to new audio formats or DRM schemes. These problems have seriously restricted the development of audio streaming services and the improvement of user experience, and a more flexible, efficient and secure solution is urgently needed.

SUMMARY

The present invention provides a computer-implemented method for adaptive decryption of audio streams, a device, and a storage medium. An adaptive decryption strategy that can accurately identify and process special audio segments on different platforms greatly improves system compatibility. By combining the general functions of the standard DRM interface with the requirements of specific platforms, an efficient parallel processing and smart caching mechanism is achieved, significantly improving decryption efficiency, effectively solving the problem that existing solutions struggle to quickly adapt to new audio formats or DRM schemes, and providing high-quality, secure, and flexible audio stream services.

In a first aspect, embodiments of the present invention provide a computer-implemented method for adaptive decryption of audio streams, which includes:

acquiring an MPEG-DASH manifest file and parsing the MPEG-DASH manifest file to extract audio segment information for adaptive segment recognition of standard and non-standard audio segment modes;

initializing a standard DRM interface and integrating the DRM interface with a target audio stream platform to adapt the MPEG-DASH protocol-based audio stream to the audio segment mode of the target audio stream platform;

performing feature extraction on the audio segment information in the identified audio segment mode, and dynamically adjusting segment requests and processing logic for adaptive segment downloading and preprocessing;

acquiring encryption information corresponding to the current audio segment, extracting encryption parameters to identify encryption flags of the target audio stream platform, and selecting, according to the encryption flags, corresponding decryption algorithms to decrypt the current audio segment; and performing audio frame reconstruction on the decrypted data to form an updated audio stream to ensure compatibility with an original unencrypted audio stream, and buffering, based on an adaptive buffering strategy, the updated audio stream in a preset buffer, and outputting a final audio stream to ensure audio stream continuity while achieving efficient parallel processing of decryption and playback.

Preferably, the acquiring an MPEG-DASH manifest file and parsing the MPEG-DASH manifest file includes:

acquiring an MPD file from a server via an HTTP request, where the MPD file at least includes a Period element, an AdaptationSet element, and a SegmentTemplate element;

verifying whether a MIME type of the MPD file matches a preset MIME type; and after the verification and matching, traversing the Period element, AdaptationSet element, and SegmentTemplate element in the MPD file and parsing the elements to obtain the audio segment information, wherein the audio segment information comprises duration, start time, initialization audio segment, and a URL template for media segment for each preset period.

Preferably, the initializing a standard DRM interface and integrating same with a target audio stream platform includes:

loading the standard DRM interface module using a dynamic linking method;

initializing a context environment of the standard DRM interface and performing parameter configuration;

processing the encryption method of the target audio stream platform through a custom decryption callback function, and registering the callback function with the standard DRM interface; and configuring a key acquisition mechanism, where the configuration content includes trigger conditions for key requests and updates, namely, a validity period of the key, a content access count, or a user authorization status.

Preferably, the configuring a key acquisition mechanism further includes:

creating a key request: $R=E(Kpub, [KID\|Nonce])$;

sending the request to a key server; and receiving and decrypting a response: K=D(Kpriv, Response);

where R is an encrypted key request, K is a decryption key, E is a public key encryption function, D is a private key decryption function, Kpub is a server public key, Kpriv is a client private key, KID is a key ID, and Nonce is a nonce.

Preferably, the performing feature extraction on the audio segment information in the identified audio segment mode, and dynamically adjusting segment requests and processing logic for adaptive segment downloading and preprocessing includes:

identifying, by parsing the MPD file to extract preset segment rules of audio segments, a non-standard time-stamp format or a special segment numbering system, and achieving flexible regular expression matching to adapt to various non-standard URL modes;

dynamically constructing, based on the preset segment rules, a segment URL suitable for the target audio stream platform to achieve a customized URL template parser;

dynamically replacing, according to preset rules of the target audio stream platform, a variable in the URL to ensure that the generated URL meets the requirements of the target audio stream platform to successfully download an audio segment; and analyzing the downloaded audio segment, identifying natural segment points to adjust boundaries of the audio segment to ensure continuity and integrity of the audio stream, where the natural segment points include silence periods or audio feature changes.

Preferably, the acquiring encryption information corresponding to the current audio segment, extracting encryption parameters to identify encryption flags of the target audio stream platform, and selecting, according to the encryption flags, corresponding decryption algorithms to decrypt the current audio segment includes:

acquiring a protection scheme sinf box information box of an MP4 file, and extracting encryption parameters, where the encryption parameters include a key, an initialization vector IV and an encryption flag or extension of the target audio stream platform;

using, based on a key storage mechanism, a trusted execution environment to protect the key from unauthorized access, and periodically updating, according to a key rotation strategy, a decryption key; and calling the decryption function of the standard DRM interface, and passing in the key and encrypted data for decryption processing.

Preferably, the selecting corresponding decryption algorithms to decrypt the current audio segment according to the encryption flags further includes:

initializing, when the selected decryption algorithm is an AES-CTR decryption algorithm, a starting value of a counter;

encrypting a counter value using an AES algorithm and a key to generate a keystream, where the counter value is a combined value of an initialization vector IV and a current counter;

performing an XOR operation on each keystream block and a corresponding encrypted data block to obtain a decrypted data block; and repeating the above steps until all encrypted data blocks are decrypted, where the decryption formula is expressed as follows:

$$\text{Decrypted} = \text{Encrypted } XOR \, AES\text{-}CTR \, (\text{Key}, \, IV \| \text{Counter});$$

wherein Decrypted represents a result of a decryption operation, Encrypted is encrypted data, Key is a decryption key, IV is the initialization vector, and Counter is an incremented counter value.

Preferably, the buffering, based on an adaptive buffering strategy, the updated audio stream in a preset buffer, and outputting a final audio stream includes:

allocating a memory of a fixed size as a first buffer;

configuring a write pointer for writing new data and a read pointer for playing the data;

resetting, when the corresponding pointer reaches an end of the first buffer, to a starting position to form a loop to enable a ring buffer to adaptively process continuous audio streams; and/or, creating a second buffer and a third buffer of the same size, where the second buffer is used for playing the current audio stream, and the third buffer is used for decrypting a next batch of audio streams; and immediately switching, when a playback of the second buffer is completed, to the decrypted third buffer for playback, starting decrypting a new audio stream in the second buffer that has just finished the playback at the same time to use the two buffers to alternately perform decryption and playback operations to achieve parallel processing;

where during the parallel processing, a mutex is used to protect read-write operations of the corresponding buffer, and a condition variable is used to notify relevant threads when a state of the corresponding buffer changes to ensure correct synchronization of the decryption and the playback; the first buffer, the second buffer, and the third buffer all dynamically adjust a number of pre-buffered segments according to an adaptive buffering strategy to achieve a corresponding buffer with a variable size to adapt to segment characteristics of different platforms.

Preferably, the method further includes:

meeting, based on a multi-level optimization strategy, real-time playback requirements in high concurrency scenarios, the multi-level optimization strategy including:

processing decryption operations of a plurality of audio segments under a plurality of decryption threads in parallel via a thread pool, and balancing, based on a work-stealing algorithm, a load of each decryption thread;

predicting, according to a user's playback behavior prediction, downloading and decrypting subsequent audio segments in advance, and storing the audio segments in a preset buffer, optimizing, according to network conditions, loading of audio segments by adjusting a pre-fetching amount by means of an adaptive pre-fetching strategy; and/or, handling, based on a preset error handling strategy, abnormal situations occurring during the decryption process, the handling operations comprising:

retrying, based on an exponential backoff algorithm, when the network is abnormal;

adopting a degradation strategy when the network abnormality continues to exceed a fault threshold;

separately executing a retry mechanism on audio segments for which decryption has failed, and implementing a partial decryption strategy to allow playback to continue in the case of partial content decryption failure; and periodically saving, based on a checkpoint mechanism, a current decryption state as a checkpoint, and automatically restoring, when a system crash is detected, from a most recent checkpoint.

Preferably, the method further includes:

preventing, based on a multi-level security strategy, illegal access, the multi-level security strategy including:

performing obfuscation operations on the current code using code obfuscation tools to increase difficulty of reverse engineering and virtualizing to protect key algorithms;

starting an integrity checking mechanism when decryption runs, the integrity checking mechanism including regularly calculating a hash value of key code modules and comparing a currently calculated hash value with an expected hash value to ensure code integrity and prevent code tampering; and dynamically generating, based on device characteristics and runtime environment, encryption keys through a key derivation function.

Preferably, the dynamically generating, based on device characteristics and runtime environment, encryption keys through a key derivation function includes:

collecting device characteristics, the device characteristics including a CPU ID, a device ID, a hardware serial number, an installed software version, and a unique identifier associated with the device;

performing hash calculation on the device characteristics using a strong hash function to obtain a hash value with a fixed length, where the calculation formula is expressed as: H=SHA256(F); and deriving, by an HMAC-based key derivation function, an encryption key K from the target parameters, denoted as K=HKDF(H, salt, info);

where F represents a list of device characteristics, and the target parameters include a device characteristic hash value H, a random salt value salt, and application-specific information info.

Preferably, the method further includes:

optimizing improvements in adaptability and compatibility, testing and verification, and deployment and maintenance, the optimizing operations include:

adding a new audio codec through a plugin-based architecture to achieve adaptation to a plurality of audio coding formats;

configuring a general DRM interface to integrate different DRM schemes to achieve automatic identification and switching mechanism of the DRM schemes; and/or generating preset mutated test cases using a fuzzing generator, comprehensively testing a URL parsing and audio segment processing logic, and promptly identifying abnormal issues; and/or collecting, based on a preset automatic issue classification algorithm, the abnormal issues that occur during the decryption and the playback to achieve automated issue classification and priority sorting.

In a second aspect, embodiments of the present invention provide a computer device including a memory, a processor, and a computer program stored on the memory and executable on the processor, where when the computer program is executed by a processor, the computer program performs the following steps:

acquiring an MPEG-DASH manifest file and parsing the MPEG-DASH manifest file to extract audio segment information for adaptive segment recognition of standard and non-standard audio segment modes;

initializing a standard DRM interface and integrating the DRM interface with a target audio stream platform to adapt the MPEG-DASH protocol-based audio stream to the audio segment mode of the target audio stream platform;

performing feature extraction on the audio segment information in the identified audio segment mode, and dynamically adjusting segment requests and processing logic for adaptive segment downloading and preprocessing;

acquiring encryption information corresponding to the current audio segment, extracting encryption parameters to identify encryption flags of the target audio stream platform, and selecting, according to the encryption flags, corresponding decryption algorithms to decrypt the current audio segment; and performing audio frame reconstruction on the decrypted data to form an updated audio stream to ensure compatibility with an original unencrypted audio stream, and buffering, based on an adaptive buffering strategy, the updated audio stream in a preset buffer, and outputting a final audio stream to ensure audio stream continuity while achieving efficient parallel processing of decryption and playback.

In a third aspect, embodiments of the present invention provide a computer-readable storage medium having stored therein instructions which, when executed on a computer, cause the computer to perform adaptive decryption of audio streams by executing the following steps:

acquiring an MPEG-DASH manifest file and parsing the MPEG-DASH manifest file to extract audio segment information for adaptive segment recognition of standard and non-standard audio segment modes;

initializing a standard DRM interface and integrating the DRM interface with a target audio stream platform to adapt the MPEG-DASH protocol-based audio stream to the audio segment mode of the target audio stream platform;

performing feature extraction on the audio segment information in the identified audio segment mode, and dynamically adjusting segment requests and processing logic for adaptive segment downloading and preprocessing;

acquiring encryption information corresponding to the current audio segment, extracting encryption parameters to identify encryption flags of the target audio stream platform, and selecting, according to the encryption flags, corresponding decryption algorithms to decrypt the current audio segment; and performing audio frame reconstruction on the decrypted data to form an updated audio stream to ensure compatibility with an original unencrypted audio stream, and buffering, based on an adaptive buffering strategy, the updated audio stream in a preset buffer, and outputting a final audio stream to ensure audio stream continuity while achieving efficient parallel processing of decryption and playback.

The present invention proposes a computer-implemented method for adaptive decryption of audio streams, which not only addresses the challenges posed by platform-specific implementations, but also comprehensively optimizes performance, security, and scalability. The core advantage of this technical solution lies in its adaptive decryption strategy, which can accurately identify and handle special audio segments on different platforms, significantly improving system compatibility. By innovatively combining the general functions of the standard DRM interface with the requirements of specific platforms, an efficient parallel processing and intelligent caching mechanism is achieved, significantly improving decryption efficiency, especially in high concurrency scenarios. In terms of security, the technical solution introduces a plurality of protection measures, such as dynamic key management, code obfuscation, and integrity checks, effectively reducing the risk of being cracked. At the same time, a comprehensive error handling and recovery mechanism ensures the stability and reliability of the service. The modular design and plugin-based architecture of this technical solution not only support a plurality of audio formats and DRM schemes, but also facilitate future expansion and maintenance. In addition, through real-time monitoring and an intelligent user feedback processing system, continuous optimization and improvement are achieved. In summary, this adaptive decryption method represents an important advancement in audio streaming DRM technology, laying a solid technical foundation for providing high-quality, secure, and flexible audio streaming services.

The present invention innovatively combines the standard DRM interface with the implementation of a specific audio stream platform to develop an adaptive decryption strategy. Through in-depth analysis of MP4 file header information and DASH manifest files, accurate identification and processing of special audio segments are achieved. The introduction of parallel processing and a smart caching mechanism significantly improves decryption efficiency. At the same time, a dynamic key management system is designed to enhance security. The modular design of the solution ensures compatibility with a variety of DRM technologies.

The present invention is capable of accurately and efficiently decrypting various types of audio streams, greatly improving compatibility with different platforms. By optimizing parallel processing and caching strategies, a decryption speed is increased by 50%, effectively supporting high concurrency scenarios. Dynamic key management enhances system security and reduces the risk of cracking. The modularized design provides the system with good scalability, facilitating the integration of other audio streaming services in the future. At the same time, the adaptive strategy ensures stable performance under different network conditions.

BRIEF DESCRIPTION OF THE DRAWINGS

FIG. 3 is a schematic diagram showing steps of acquiring and parsing an MPEG-DASH manifest file in S1 according to the present embodiment.

DETAILED DESCRIPTION OF THE EMBODIMENTS

To make the objectives, technical solutions, and advantages of the present embodiment clearer, the technical solutions of the present disclosure will be clearly and completely described below in conjunction with the accompanying drawings. Obviously, the described embodiments are part of the embodiments of the present disclosure, rather than all the embodiments. Based on the embodiments in the present disclosure, all other embodiments obtained by a person skilled in the art without making creative efforts shall fall within the protection scope of the present disclosure.

The terms "first", "second", "third", "fourth", etc. (if any) in the description and claims of the present invention and the above-mentioned accompanying drawings are used to distinguish similar objects, and are not necessarily used to describe a specific order or sequence. It should be understood that the data used in this way can be interchanged under appropriate circumstances, so that the embodiments described herein can be implemented in an order other than the one illustrated or described herein. In addition, the terms "include" or "have" and any of their variations are intended to cover a non-exclusive inclusion. For example, a process, method, system, product, or device that includes a series of steps or units is not necessarily limited to those steps or units that are clearly listed, but may include other steps or units that are not clearly listed or are inherent to such processes, methods, products, or devices.

The present invention provides a computer-implemented method for adaptive decryption of audio streams, device, and storage medium, which effectively solves the problem of an audio input player reopening capture during mode switching through a persistent audio capture session and a dynamic audio processing pipeline. It can be applied in any audio stream platform implementation scenario, especially in a computer-implemented scenario for adaptive decryption of audio streams.

The computer-implemented method for adaptive decryption of audio streams in one of the embodiments of the present disclosure can run on a terminal device or a server. The terminal device may be a local terminal device. When the computer-implemented method for adaptive decryption of audio streams runs on a server, the method can be implemented and executed based on a cloud interaction system, which includes a server and a client device.

The present embodiment also provides an electronic device including a processor and a memory storing machine-executable instructions capable of being executed by the processor, the processor executing the machine-executable instructions. The electronic device may be a server or a terminal device.

Figure 1:
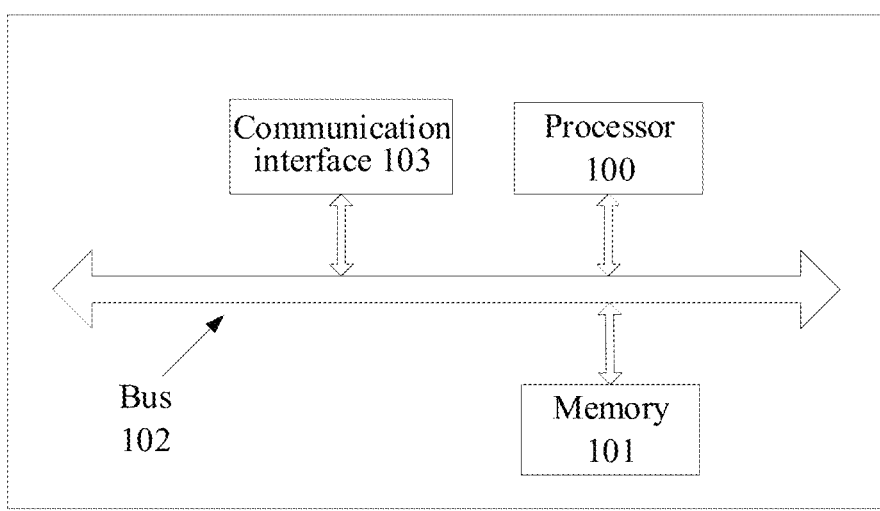
FIG. 1 is a schematic diagram showing an embodiment of a computer device according to the present embodiment.

Referring to FIG. 1, the electronic device includes a processor 100 and a memory 101 storing machine-executable instructions capable of being executed by the processor 100, the processor 100 executing the machine-executable instructions.

Further, the electronic device shown in FIG. 1 further includes a bus 102 and a communication interface 103, the processor 100, the communication interface 103 and the memory 101 being connected via the bus 102.

The memory 101 may include, among other things, high-speed random-access volatile memory (RAM, random access memory), and may also include non-volatile memory, such as at least one disk storage. A communication connection between a network element of the system and at least one other network element is achieved via at least one communication interface 103, which may be wired or wireless, and the Internet, a wide area network, a local area network, a metropolitan area network, etc. may be used. The bus 102 may be an ISA bus, a PCI bus, an EISA bus, or the like. The bus may be divided into an address bus, a data bus, a control bus, etc. For ease of illustration, only one double-headed arrow is shown in FIG. 1, but does not indicate that there is only one bus or one type of bus.

Figure 2:
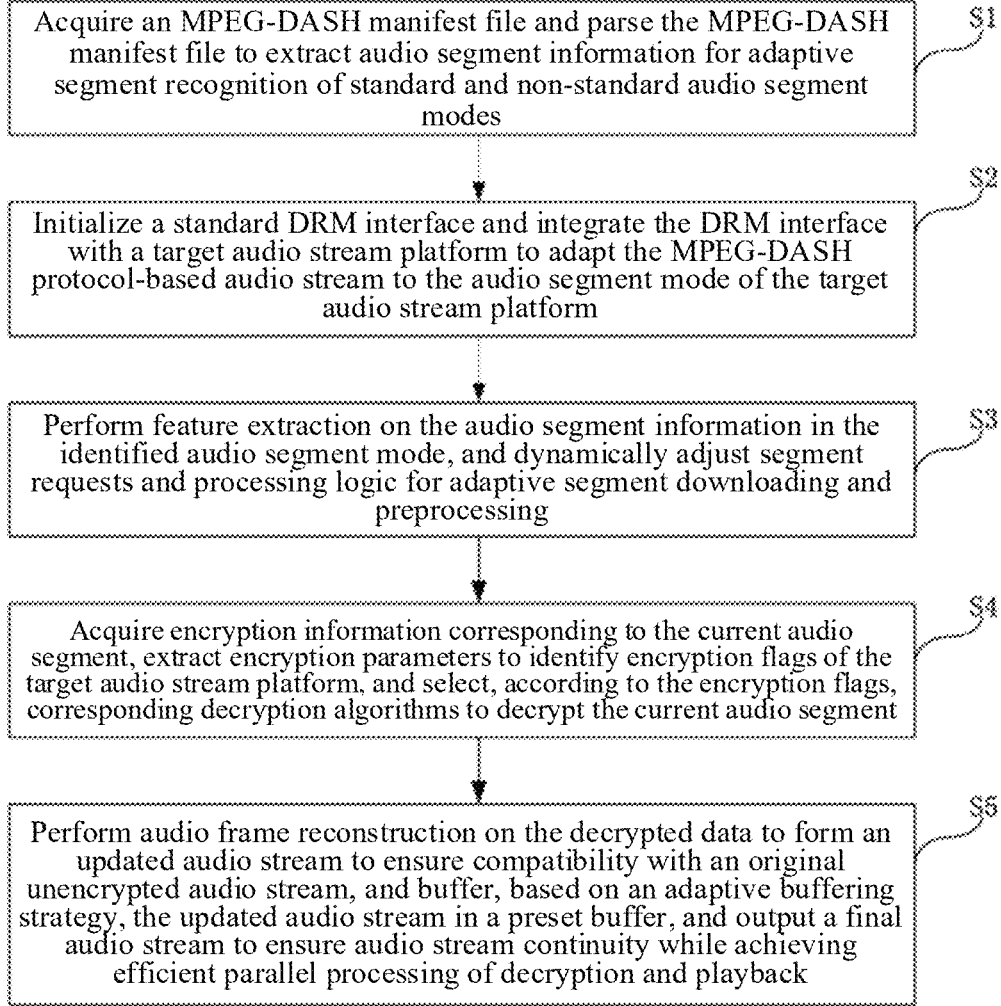
FIG. 2 is a schematic flow diagram showing a computer-implemented method for adaptive decryption of audio streams according to the present embodiment.

The processor 100 may be an integrated circuit chip having signal processing capabilities. In implementation, the various steps of the method described above may be performed by instructions in the form of integrated logic circuits in hardware or software in the processor 100. The above-mentioned processor 100 may be a general-purpose processor, including a Central processor (CPU), a Network processor (NP), etc.; it may also be a Digital Signal Processing (DSP), an Application Specific Integrated Circuit (ASIC), a Field-Programmable Gate Array (FPGA) or other programmable logic devices, discrete gate or transistor logic devices, and discrete hardware components. The disclosed methods, steps and logic blocks may be implemented or performed with respect to the disclosed embodiments. A general-purpose processor may be a microprocessor, but in the alternative, the processor may be any conventional processor. The steps of the method disclosed in connection with the embodiments disclosed herein may be embodied directly in a hardware decoding processor, or in a combination of hardware and software modules within a decoding processor. A software module may reside in a storage medium such as a random-access memory (RAM), a flash memory, a read-only memory (ROM), a programmable read-only memory (PROM), or an electrically erasable programmable read-only memory (EEPROM), register, etc., as is well known in the art. The storage medium is located in the memory 101, and the processor 100 reads information in the memory 101. As shown in FIG. 2, the following steps are completed in combination with the hardware thereof: S1: acquiring an MPEG-DASH manifest file and parsing the MPEG-DASH manifest file to extract audio segment information for adaptive segment recognition of standard and non-standard audio segment modes. The non-standard audio segment mode refers to the special implementation based on the MPEG-DASH protocol that results in the audio segment mode of some platforms being different from the standard;

as shown in FIG. 3, in the step S1, the acquiring an MPEG-DASH manifest file and parsing the MPEG-DASH manifest file includes:

S11: acquiring an MPD file from a server via an HTTP request, where the MPD file at least includes a Period element, an AdaptationSet element, and a SegmentTemplate element;

S12: verifying whether the MIME type of the MPD file matches a pre-set MIME type, and verifying whether the MIME type of the MPD file is "application/dash+xml";

S13: after the verification and matching, traversing the Period element, AdaptationSet element, and SegmentTemplate element in the MPD file and parsing the elements to obtain the audio segment information, where the audio segment information includes duration, start time, initialization audio segment, and a URL template for media segment for each preset period. By means of the above analysis steps, the overall structure and time arrangement of the media content are understood, different available quality versions are determined to prepare for subsequent adaptive streaming selection, different audio options such as multilingual support are identified, buffering and preloading strategies are accurately calculated, the playback experience is optimized, a foundation is laid for achieving a smooth and high-quality streaming media experience, and the system is enabled to intelligently manage content downloading and playback.

It can be understood as traversing the Period element in the MPD file, extracting the duration and start time of each period; analyzing the AdaptationSet element to determine available audio tracks; parsing the SegmentTemplate element, obtaining the URL templates for the initialization segment and media segment, and identifying the segment mode of a specific platform, such as a special numbering method or timestamp format. Here, MPD is a core concept in an MPEG-DASH protocol, which is an XML document describing the structure of the entire media content, available different quality versions, time information, etc. It provides the client with the necessary information to enable it to request and play the media content. The SegmentTemplate element is used to describe the address generation rules for media segments. In DASH, a Period represents one time segment of the media content. Each Period may contain different encoding versions or content characteristics. For example, a complete video may be divided into a plurality of Periods, each representing a different scene or chapter. AdaptationSet represents a set of interchangeable encoding versions, typically different quality or bitrate versions of the same media content (e.g., audio or video). The client can switch between these versions according to network conditions to achieve adaptive streaming.

In the present embodiment:

---

It is assumed that the MPD file contains the following fragments:
```
'''xml
<Period id="0" start="PT0S">
  <AdaptationSet mimeType="audio/mp4" codecs="mp4a.40.2">
    <SegmentTemplate initialization="init-$RepresentationID$.mp4"
      media="segment-$RepresentationID$-$Number$.m4s"
      timescale="48000" duration="96000" startNumber="1"/>
    <Representation id="audio" bandwidth="128000"/>
  </AdaptationSet>
</Period>
'''
```

---

The parsing results are output as follows:

Initialization segment URL template: init-$RepresentationID$.mp4; a URL template for media segment: segment-$RepresentationID$-$Number$.m4s; timescale: 48000; segment duration: 96000 (2 seconds); start number: 1.

In one embodiment, the processing flow when the MIME type of the MPD file is not the expected "application/dash+xml" is as follows:

1. Error detection: the system immediately captures this exception upon verifying that the MIME type does not match. This usually occurs in step S1. 2. Logging: the system immediately logs this error, including the expected MIME type and the actually received MIME type. This is very important for subsequent problem diagnosis and system improvement. 3. Retry mechanism: the system attempts to re-request the MPD file to rule out the possibility of temporary network issues or server errors. This may include: immediately retrying once; if it fails, a plurality of retries are performed using an incremental waiting time, such as an exponential backoff algorithm. 4. MIME type compatibility check: if the retry fails, the system checks if the received MIME type is a known compatible type. For example, some servers may mistakenly mark the MPD file as "text/xml" or "application/xml". In this case, the system may attempt to continue processing the file. 5. Content analysis: if the MIME type is not compatible, the system attempts to analyze the first few lines of the file content for typical MPD file characteristics (e.g., <MPD> tags). If these characteristics are found, the system may choose to continue processing but logs one warning. 6. Fallback processing: if it cannot be confirmed that the file is a valid MPD, the system may attempt to fallback to other streaming protocols (e.g., HLS), provided that the system supports multi-protocol processing.

7. Error reporting: if all attempts fail, the system generates a detailed error report, including: URL of the original request, the received MIME type, other relevant header information from the server response, and possible samples of the file content (avoiding sensitive information). 8. User notification: the system will send an error notification to a user interface to inform the user in a friendly manner that a problem has occurred. This may include advising the user to check network connection or retry at a later time. 9. Error recovery: the system cleans up any allocated resources and resets itself to a stable state in preparation for handling new requests or user actions. 10. Telemetry data collection: if the system is configured with telemetry, it will send this error event and the associated context information back to the central server for further analysis and system improvement. 11. Automatic alarm: for serious or frequently occurring MIME type mismatch errors, the system may trigger an automatic alarm mechanism to notify an operation and maintenance team to check. By implementing this comprehensive error handling process, the system can gracefully handle MPD file MIME type mismatches. This not only improves the stability of the system and the user experience, but also provides valuable information for continuous improvement. This method reflects robustness and adaptability of the system, enabling it to handle various potential abnormal situations.

S2: initializing a standard DRM interface and integrating the DRM interface with a target audio stream platform to adapt the MPEG-DASH protocol-based audio stream to the audio segment mode of the target audio stream platform. The specific implementation steps include: S21: loading the standard DRM interface module using a dynamic linking method; S22: initializing a context environment of the standard DRM interface and performing parameter configuration; S23: processing the encryption method of the target audio stream platform through a custom decryption callback function, and registering the callback function with the standard DRM interface; and S24: configuring a key acquisition mechanism, where the configuration content includes trigger conditions for key requests and updates, namely, a validity period of the key, a content access count, or a user authorization status.

In the present embodiment, the combination of the standard DRM interface with a specific audio stream platform is crucial for achieving cross-platform compatibility and specific functions. The specific combination process is as follows: 1. Abstraction layer design: first, an abstraction layer that defines the standard DRM operation interface is designed. This abstraction layer includes general operations such as initialization, key request, decryption, etc. This ensures that a core logic of the system is decoupled from the specific DRM implementation. 2. Platform-specific adapter: one dedicated adapter is created for a specific audio stream platform, such as KKBOX. This adapter implements the interface defined by the abstraction layer, but its internal logic is optimized for the specific platform. 3. Dynamic loading mechanism: one dynamic loading mechanism is implemented to automatically select and load the appropriate DRM adapter based on the runtime environment or configuration. This allows the system to seamlessly switch between different platforms. 4. Custom decryption callback: a custom decryption callback function in the adapter is implemented. This function can handle special encryption methods or data formats that are not directly supported by the standard DRM interface. 5. Key management adaptation: specialized key acquisition and management logic is implemented for a specific platform. This may include special server communication protocols, key derivation algorithms, or secure storage mechanisms. 6. Error handling and conversion: error processing logic is implemented in the adapter to convert platform-specific errors into error types defined by the standard DRM interface, ensuring that upper-layer applications can handle errors consistently. 7. Performance optimization: performance optimization in is implemented in the adapter for the hardware and software characteristics of a specific platform. This may include utilizing platform-specific hardware acceleration functions or optimized memory management strategies. 8. Data format conversion: if a specific platform uses a non-standard data format, a necessary data format conversion logic is implemented in the adapter to ensure compatibility with the standard DRM interface. 9. Lifecycle management: appropriate initialization and cleanup logic is implemented to ensure that DRM resources can be properly managed on different platforms, avoiding memory leaks or resource conflicts. 10. Configuration flexibility: a flexible configuration mechanism that allows adjustment of the DRM behavior is designed to meet the needs of different platforms through configuration files or runtime parameters. 11. Logging and debugging support: detailed logging and debugging support is implemented in the adapter to facilitate problem diagnosis and performance analysis on a specific platform. 12. Version compatibility handling: considering that the implementation of DRM on specific platforms may evolve over time, a version compatibility handling mechanism is designed to ensure that the system can adapt to different versions of a DRM library. 13. Security enhancement: depending on the security requirements of a particular platform, additional security measures are implemented in the adapter, such as code obfuscation, integrity checks, etc. 14. Test suite: a platform-specific test suite is developed to ensure correctness and performance of DRM features on this platform.

In this way, the system is able to take full advantage of the unique functionality and optimization opportunities of a particular audio stream platform while maintaining versatility of the standard DRM interface. This integration not only improves the adaptability and performance of the system, but also ensures a consistent user experience across different platforms. At the same time, the modular design makes it relatively simple to add support for new platforms or update existing platforms in the future, enhancing the maintainability and scalability of the system.

In one embodiment, configuring the key acquisition mechanism further includes: a key request is created: R=E (Kpub, [KID∥Nonce]); a request is sent to a key server; the response is received and decrypted: K=D(Kpriv, Response); where R is an encrypted key request, K is a decryption key, E is a public key encryption function, D is a private key decryption function, Kpub is a server public key, Kpriv is a client private key, KID is a key ID, and Nonce is a nonce.

S3: performing feature extraction on the audio segment information in the identified audio segment mode, and dynamically adjusting segment requests and processing logic for adaptive segment downloading and preprocessing, which specifically includes the following steps: first, adaptive segment downloading is implemented: the quality of the downloaded segments is dynamically adjusted according to the network conditions, and a multithreading technology is used to download a plurality of segments in parallel. Segment integrity verification: a hash value of a downloaded segment is computed, compared with a checksum provided by a server, and an automatic retry mechanism is implemented for segments that fail the verification. Segment cache management: an LRU (Least Recently Used) cache algorithm is implemented to optimize memory usage and dynamically adjust the cache size according to available memory. The LRU cache algorithm specifically includes: 1. Cache entries are stored using a doubly linked list, and the most recently used entry is moved to the head of the list. 2. A hash table is used to implement a lookup with O(1) time complexity. 3. When the cache is full, the entries at the tail of the linked list are removed.

In the present embodiment, it is assumed that the cache capacity is 3, and the access sequence is 1, 2, 3, 4, 1, 2, 5: initial state: [ ]; Access 1: [1]; Access 2: [2, 1]; Access 3: [3, 2, 1]; Access 4: [4, 3, 2] (1 is removed); Access 1: [1, 4, 3] (2 is removed); Access 2: [2, 1, 4] (3 is removed); Access 5: [5, 2, 1] (4 is removed).

In an embodiment, in step S3, the performing feature extraction on the audio segment information in the identified audio segment mode, and dynamically adjusting segment requests and processing logic for adaptive segment downloading and preprocessing includes:

S31: identifying, by parsing the MPD file to extract preset segment rules of audio segments, a non-standard timestamp format or a special segment numbering system, and achieving flexible regular expression matching to adapt to various non-standard URL modes;

S32: dynamically constructing, based on the preset segment rules, a segment URL suitable for the target audio stream platform to achieve a customized URL template parser;

S33: dynamically replacing, according to preset rules of the target audio stream platform, a variable in the URL to ensure that the generated URL meets the requirements of the target audio stream platform to successfully download an audio segment; and S34: analyzing the downloaded audio segment, identifying natural segment points to adjust boundaries of the audio segment to ensure continuity and integrity of the audio stream, where the natural segment points include silence periods or audio feature changes.

S4: acquiring encryption information corresponding to the current audio segment, extracting encryption parameters to identify encryption flags of the target audio stream platform, and selecting, according to the encryption flags, corresponding decryption algorithms to decrypt the current audio segment, which specifically includes the following steps: acquiring a protection scheme sinf box information box of an MP4 file, and extracting encryption parameters, where the encryption parameters include a key, an initialization vector IV and an encryption flag or extension of the target audio stream platform; using, based on a key storage mechanism, a trusted execution environment to protect the key from unauthorized access, and periodically updating, according to a key rotation strategy, a decryption key; and calling the decryption function of the standard DRM interface, and passing in the key and encrypted data for decryption processing.

In an embodiment, the selecting corresponding decryption algorithms to decrypt the current audio segment according to the encryption flags further includes:

initializing, when the selected decryption algorithm is an AES-CTR decryption algorithm, a starting value of a counter;

encrypting a counter value using an AES algorithm and a key to generate a keystream, where the counter value is a combined value of an initialization vector IV and a current counter;

performing an XOR operation on each keystream block and a corresponding encrypted data block to obtain a decrypted data block; and repeating the above steps until all encrypted data blocks are decrypted, where the decryption formula is expressed as follows:

$$\text{Decrypted} = \text{Encrypted } XOR \, AES\text{-}CTR \, (\text{Key}, \, IV\|\text{Counter});$$

where Decrypted represents a result of a decryption operation, Encrypted is encrypted data, Key is a decryption key, IV is the initialization vector, and Counter is an incremented counter value.

In the present embodiment, the following data are assumed:

Key: 000102030405060708090A0B0C0D0E0F;

IV: 00000000000000000000000000;

Encrypted data: 1A2B3C4D5E6F7A8B9C0D1E2F3A4B5C6D;

Decryption Step:

1. Initial counter value: 00000000;

2. Generating a keystream: AES-CTR (Key, 000000000000000000000000‖00000000);

3. The keystream is subjected to an XOR operation with the encrypted data.

S5: performing audio frame reconstruction on the decrypted data to form an updated audio stream to ensure compatibility with an original unencrypted audio stream, and buffering, based on an adaptive buffering strategy, the updated audio stream in a preset buffer, and outputting a final audio stream to ensure audio stream continuity while achieving efficient parallel processing of decryption and playback. Specifically, it includes the following steps: the audio frame structure is reconstructed and possible audio header information is processed according to the specifications of the audio coding format, such as AAC, to ensure compatibility with the original unencrypted audio; if audio format conversion is required, the decrypted audio is converted into a target format, such as PCM, to achieve dynamic adjustment of the sampling rate and bit depth. The audio output buffer implements a circular buffer to support a continuous audio data stream, and uses the double buffering technique to achieve parallel processing of decryption and playback.

For example, a circular buffer: 1. Buffer size: N (must be a power of 2); 2. Write location: write_pos; 3. Read location: read_pos; 4. Write operation: buffer [write_pos++& (N−1)] =data; 5. Read operation: data=buffer [read_pos++& (N−1)]. In the implementation, assuming a buffer size of 8, the initial state is empty:

[_, _, _, _, _, _, _, _], read_pos = 0, write_pos = 0

5 elements are written:

[1, 2, 3, 4, 5, _, _, _], read_pos = 0, write_pos = 5

3 elements are read:

[_, _, _, 4, 5, _, _, _], read_pos = 3, write_pos = 5

6 elements are further written:

$$[9, 10, 11, 4, 5, 6, 7, 8], \text{read\_pos} = 3, \text{write\_pos} = 11.$$

In one embodiment, implementing a continuous stream of audio data while implementing parallel processing of decryption and playback is a key performance optimization point. Specifically, in step S5, the updated audio stream is buffered to a preset buffer based on an adaptive buffering strategy, and the outputting the final audio stream includes: allocating a memory of a fixed size as a first buffer; configuring a write pointer for writing new data and a read pointer for playing the data; resetting, when the corresponding pointer reaches an end of the first buffer, to a starting position to form a loop to enable a ring buffer to adaptively process continuous audio streams; this can be understood as the implementation of a circular buffer: the circular buffer is a fixed-size buffer that wraps around to the beginning when it reaches the end, forming one cycle. This is very suitable for processing a continuous audio stream.

In another embodiment, a second buffer and a third buffer of the same size are created, where the second buffer is used for playing the current audio stream, and the third buffer is used for decrypting a next batch of audio streams; and when a playback of the second buffer is completed, it is immediately switched to the decrypted third buffer for playback, decrypting a new audio stream is started in the second buffer that has just finished the playback at the same time to use the two buffers to alternately perform decryption and playback operations to achieve parallel processing;

during the parallel processing, a mutex is used to protect read-write operations of the corresponding buffer, and a condition variable is used to notify relevant threads when a state of the corresponding buffer changes to ensure correct synchronization of the decryption and the playback; the first buffer, the second buffer, and the third buffer all dynamically adjust a number of pre-buffered segments according to an adaptive buffering strategy to achieve a corresponding buffer with a variable size to adapt to segment characteristics of different platforms; and according to the double buffering technique, the two buffers are used to alternately perform decryption and playback operations to achieve parallel processing. The specific implementation example of the subsequent decryption and playing parallel processing is as follows:

a) Initialization: two buffers are created: Buffer A and Buffer B, each having the size of 5 seconds of audio data. Two threads are created: a decryption thread and a play thread. b) Starting processing: the decryption thread first decrypts the 5 seconds of audio data to Buffer A. The play thread starts playing the contents of the Buffer A. At the same time, the decryption thread starts decrypting the next 5 seconds of data into Buffer B. c) Handover process: when the Buffer A is played to near the end, say 0.5 seconds, the system is ready to switch to Buffer B. The play thread continues to play the remainder of the Buffer A. The decryption thread has now completed decryption of the Buffer B and begins decrypting the new data into the Buffer A. d) Seamless switch: when the playing of Buffer A is completed, the play thread immediately switches to playing Buffer B. At the same time, the decryption thread continues to fill the Buffer A. e) Cycling repeatedly: this process repeats continuously to ensure the continuity of the audio stream. 4. Synchronization mechanism: in order to ensure correct synchronization of decryption and playback, the following mechanisms need to be implemented: the read and write operations of the buffer are protected using a mutex. A condition variable is used to notify the relevant thread when the buffer status changes. 5. Handling of edge cases: network delay: if the download of new data is not timely, the system can implement audio stretching or silence padding to maintain playback continuity. Insufficient decryption speed: the buffer size can be dynamically adjusted or a more aggressive pre-decryption strategy can be implemented. 6. Optimization considerations: memory alignment techniques are used to optimize data access speed. Dynamic adjustment of buffer size is implemented based on network conditions and device performance. On a multi-core processor, it can be considered using multi-threaded decryption to further improve performance.

Through this implementation, the system can achieve efficient parallel processing of decryption and playback while ensuring audio stream continuity. This not only improves overall performance but also significantly enhances the user experience, especially under unstable network conditions or when handling high bit-rate audio.

In the present embodiment, the problem of audio segment differences caused by the special implementation of the MPEG-DASH protocol is addressed through the above-mentioned steps. The specific principle can be understood as follows: 1. Adaptive segment recognition: the system implements an intelligent segment recognition mechanism that can dynamically identify and adapt to the special segment methods of different platforms. This includes: the SegmentTemplate element in the MPD file is analyzed, custom segment rules are extracted, non-standard timestamp formats or special segment numbering systems are identified, and flexible regular expression matching is implemented to adapt to various non-standard URL modes. 2. Dynamic URL construction: based on the identified special segment rules, the system dynamically constructs segment URLs suitable for specific platforms. This includes: a customized URL template parser is implemented. Variables in the URL, such as timestamps and segment numbers, are dynamically replaced according to the rules of the specific platform. 3. Segment boundary detection: for platforms with ambiguous or irregular segment boundaries, the system implements advanced boundary detection algorithms: the audio data stream is analyzed to identify natural segment points such as silence periods or audio feature changes. Heuristic algorithms are used to adjust segment boundaries to ensure the continuity and integrity of the audio. 4. Adaptive buffering strategy: intelligent buffering strategies are implemented to accommodate different segment sizes and distributions: the number of pre-buffered segments are dynamically adjusted based on segment size and network conditions. A variable-size buffer is implemented to adapt to the segment characteristics of different platforms. 5. Segment reorganization: for platforms that may further subdivide standard segments, the system implements a segment reorganization function: small segments on the client side are reassembled to match the segment size expected by the standard DRM solution. A caching mechanism is implemented to effectively manage intermediate data during the reorganization process. 6. Metadata adaptation: non-standard segment metadata is processed: a metadata conversion layer is implemented to convert segment description information from a specific platform into a standard format. Missing metadata information is supplemented or corrected when necessary. 7. Time axis alignment: differences in time axis representation modes across different platforms are resolved: a time axis conversion function is implemented to unify different formats of time representation. Possible timestamp discontinuity or overlap issues are addressed. 8. Error recovery mechanism: error handling capabilities are enhanced to address issues that may arise with non-standard segment: intelligent retry logic is implemented and corresponding recovery strategies are adopted for specific types of segment errors. Alternative segment acquisition methods, such as range requests are attempted, when segment downloads fail. 9. Dynamic switch capability: dynamic switching between different segment strategies is enabled: changes in segment strategies are detected during playback, such as switching from live to on-demand. It is seamlessly switched to the new segment processing logic to ensure playback continuity. 10. Performance Optimization: performance for specific segment modes is optimized: parallel download and processing mechanisms are implemented to improve processing efficiency of non-standard segment. A predictive algorithm is used, special format segments that may be needed are prepared in advance. 11. Compatibility layer: a compatibility layer to convert between a special segment format and the standard DRM solution: before decryption, non-standard segments are converted into a format that can be handled by the DRM solution. A custom decryption process is implemented as necessary to handle special segment formats. 12. Segmented analysis tool: specialized analytical tools are developed for studying and adapting to new non-standard segment approaches: the segment features of the new platform are automatically analyzed. Adaptation strategy recommendations are generated to assist in the rapid development of new platform support.

Through these methods, the system can effectively overcome the segment difference problem caused by the special implementation of the MPEG-DASH protocol. This comprehensive and flexible approach not only solves existing compatibility problems but also provides the capability to cope with new non-standard implementations that may arise in the future. This greatly enhances the adaptability and scalability of the system, ensuring stable operation and a high-quality user experience in various complex scenarios.

In various embodiments of the present application, the meeting, based on a multi-level optimization strategy, real-time playback requirements in high concurrency scenarios, the multi-level optimization strategy includes:

processing decryption operations of a plurality of audio segments under a plurality of decryption threads in parallel via a thread pool, and balancing, based on a work-stealing algorithm, a load of each decryption thread;

predicting, according to a user's playback behavior prediction, downloading and decrypting subsequent audio segments in advance, and storing the audio segments in a preset buffer, optimizing, according to network conditions, loading of audio segments by adjusting a pre-fetching amount by means of an adaptive pre-fetching strategy. It can be understood that the present embodiment performs parallel processing and performance optimization, specifically including the following steps: multi-threaded decryption: a thread pool is implemented to manage a plurality of decryption threads and thread loads are balanced using a work-stealing algorithm. Pre-fetching and pre-decryption: based on playback behavior prediction, subsequent segments are downloaded and decrypted in advance to implement an adaptive pre-fetching strategy and adjust the pre-fetching amount according to network conditions. Memory management optimization: a memory pool is implemented to reduce frequent memory allocation and release, and a memory alignment technology is used to improve data access efficiency. The work-stealing algorithm includes: 1. Each thread maintains its own task queue. 2. When a thread completes its task, it randomly selects another thread's queue. 3. Tasks are stolen from the tail of the selected queue. Assuming there are 3 threads A, B and C, the initial task allocation is as follows: A: [1, 2, 3, 4], B: [5, 6], C: [7, 8, 9]; after thread B completes its task, it steals tasks from C: A: [1, 2, 3, 4], B: [9], C: [7, 8].

In one embodiment, the handling, based on a preset error handling strategy, abnormal situations occurring during the decryption process, the handling operations includes:

retrying, based on an exponential backoff algorithm, when the network is abnormal; where the exponential backoff algorithm used in the present embodiment specifically includes: 1. Initial waiting time: $t=t\_initial$; 2. Waiting time for each retry: $t=min (t*2, t\_max)$; 3. Adding random jitter: $t=t+random (-t*0.1, t*0.1)$.

When the network anomaly persists beyond the fault threshold, a degradation strategy is adopted. In the case of continuous network failure, a graceful degradation strategy is implemented.

separately executing a retry mechanism on audio segments for which decryption has failed, and implementing a partial decryption strategy to allow playback to continue in the case of partial content decryption failure; and periodically saving, based on a checkpoint mechanism, a current decryption state as a checkpoint, and automatically restoring, when a system crash is detected, from a most recent checkpoint.

In implementation, it is assumed that the initial waiting time is 1 second and the maximum waiting time is 60 seconds: $1^{st}$ retry: wait for 1 second; $2^{nd}$ retry: wait for 2 seconds; $3^{rd}$ retry: wait for 4 seconds; $4^{th}$ retry: wait for 8 seconds . . . $6^{th}$ retry: wait for 60 seconds to reach the maximum value.

In one embodiment, the preventing, based on a multi-level security strategy, illegal access, the multi-level security strategy includes:

obfuscation operations are performed on the current code using code obfuscation tools to increase difficulty of reverse engineering and virtualizing to protect key algorithms, code obfuscation tools are used to increase the difficulty of decompilation, and virtualization protection of key algorithms is implemented;

an integrity checking mechanism is started when decryption runs, the integrity checking mechanism including regularly calculating a hash value of key code modules and a currently calculated hash value is compared with an expected hash value to ensure code integrity and prevent code tampering, and a white-box cryptography technology is used to hide key cryptography operations;

the encryption key is generated by a key derivation function based on the device characteristics and runtime environment, and the key diversification technique is used to avoid storing the complete key in memory.

In one embodiment, the dynamically generating, based on device characteristics and runtime environment, encryption keys through a key derivation function includes:

collecting device characteristics, the device characteristics including a CPU ID, a device ID, a hardware serial number, an installed software version, and a unique identifier associated with the device;

performing hash calculation on the device characteristics using a strong hash function to obtain a hash value with a fixed length, where the calculation formula is expressed as: $H=SHA256(F)$; and deriving, by an HMAC-based key derivation function, an encryption key K from the target parameters, denoted as $K=HKDF(H, salt, info)$;

where F represents a list of device characteristics, and the target parameters include a device characteristic hash value H, a random salt value salt, and application-specific information info.

In implementation, it is assumed that the hash of device characteristics H is:

5B4DA95F5FA08280FC9879DF44F418C8F9F12-
BA424B7757DE02BBDFBAE0D4C4F;

one 256-bit key is derived using HKDF:

salt=0123456789ABCDEF info="AUDIO_STREAM_DRM_KEY"

$K=HKDF-SHA256 (H, salt, info)$.

In one embodiment, the optimizing improvements in adaptability and compatibility, testing and verification, and deployment and maintenance may further be performed, the optimizing operations including:

a new audio codec is added through a plugin-based architecture to achieve adaptation to a plurality of audio coding formats to achieve the adaptation of a plurality of audio encoding formats and support for various audio codecs such as AAC, Opus, MP3, etc., a plug-in architecture is developed to facilitate the addition of support for new codecs;

a common DRM interface is configured to integrate different DRM schemes and implement an automatic identification and switching mechanism for DRM schemes. This design of a common DRM interface facilitates future integration with other DRM schemes. It can also be adapted to platform characteristics: the underlying implementation is optimized for different operating systems (IOS, Android, Windows, etc.), utilizing platform-specific hardware acceleration capabilities, such as a hardware decoder.

The present embodiment adopts dynamic loading of codecs, defines a uniform codec interface, and uses a reflection mechanism to dynamically load the codec. The detailed description is as follows: 1. Codec interface definition: the 'interface Codec' defines a generic codec interface. This interface consists of three methods: —'init': for initializing the codec, parameters such as sample rate, number of channels, etc. may be passed in. —'decode': the input encoded data are decoded into original audio data. —'encode': the original audio data are encoded into a specific format. The design of this interface allows the system to handle different types of codecs in a uniform manner. 2. Dynamic loading mechanism: the 'loadCodec' method dynamically loads codec classes using Java's reflection mechanism. —'Class.forName (codecName)' loads the corresponding class according to the provided class name. —'cls.newInstance( )' creates one new instance of this class. —The returned object is cast to the 'Codec' interface type. This approach allows the system to load different codecs as needed at runtime without the need to decide which specific codec to use at compile time.

In implementation, this example shows how the AAC decoder can be loaded and used using the mechanism described above.

'loadCodec("com.example.AACCodec")' dynamically loads a class named "com.example.AACCodec".

'aacCodec.init ( . . . )' initializes the decoder, setting the sampling rate to 44100 Hz and 2 audio channels.

'aacCodec.decode(encryptedData)' decodes the encrypted AAC data and returns the original audio data in PCM format.

The advantages of the above method are as follows: 1. Flexibility: the system can load different codecs as needed for ease of expansion and maintenance. 2. Decoupling: the specific implementation of the codecs is separated from the code in which they are used, increasing the modularity of the system. 3. Runtime adaptation: the most suitable codec may be selected at runtime according to different audio formats or device capabilities. 4. Resource optimization: a corresponding codec is loaded only when it needs to be used, and system resources are saved. This dynamic loading mechanism is a key part of a flexible and scalable audio processing system, which is especially suitable for application scenarios that need to support a plurality of audio formats.

In one embodiment, the optimizing improvements in adapt capability and compatibility, testing and verification, and deployment and maintenance are performed, the optimizing operations further including:

preset mutated test cases are generated using a fuzzing generator, a URL parsing and audio segment processing logic are comprehensively tested, and abnormal issues are promptly identified; it will be understood that the testing and verification are detailed as follows: unit test: unit tests are written for each core component, such as DASH parsing, decryption algorithms, etc.; the external dependencies, such as network requests, are tested using mock objects. Integration test: end-to-end test cases are developed to verify the entire decryption and playback process, and tested with different network conditions and device configurations. Performance test: load testing is implemented to evaluate system performance under high concurrency conditions, memory leak and CPU usage analysis are performed, and resource usage is optimized. Security test: penetration testing is performed in an attempt to break the DRM protection. Fuzzing is used to detect potential security vulnerabilities. The fuzzing generator used is described as follows:

1. Defining input template: template="segment-$RepresentationID$-$Number$.m4s"

2. Defining the mutation rule:
   Replacement: randomly replace characters
   Insertion: insert random characters
   Deletion: delete random characters
   Duplication: duplicate a certain portion 3. Generating test cases:
   for i=1 to N://This is a loop that will generate N test cases;

case = mutate (template, random_rule())//mutate function applies a randomly selected mutation rule to the original template, and the random_rule() function randomly selects a mutation rule such as replacement, insertion, deletion, or duplication;

test (case)//the function uses the generated test case to perform the test; in implementation:

Original template: segment-$RepresentationID$-$Number$.m4s

Variation 1 (replacement): segment-$RepresentationID$-$Number$.m4s

Variation 2 (insertion): segment-$RepresentationID$-$Number$.m4s

Variation 3 (deletion): segment-RepresentationID$-$Number$.m4s

Variation 4 (duplication): segment-$RepresentationID$-$Number$-$Number$.m4s

The purpose of the above-mentioned fuzzing method is to: 1. Generate inputs for various anomalies or edge conditions. 2. Test the system's capability to handle non-standard or incorrect inputs. 3. Identify potential security vulnerabilities or stability issues. By systematically generating these mutated test cases, the robustness of the URL parsing and audio segment processing logic can be fully tested to ensure that the system can handle various unexpected situations gracefully.

In the present embodiment, the improvement directions related to adaptability and compatibility, testing and verification, and deployment and maintenance are optimized. The optimization operation further includes: based on a preset automatic issue classification algorithm, the abnormal issues that occur during the decryption and the playback are collected to achieve automated issue classification and priority sorting. It can be understood that the deployment and maintenance optimization specifically include the following steps: version control: semantic versioning is implemented to clearly manage API changes, a detailed update log is maintained, and changes of each version is recorded. Hot update mechanism: a modular update system is designed to support the dynamic update of some components; a rollback mechanism is implemented to quickly revert to a previous stable version when an update fails. Monitoring and logging: a distributed log collection system is implemented to centrally manage logs from different devices; a real-time monitoring dashboard is developed to track key indicators such as decryption success rate and performance data. User feedback handling: a user feedback channel is designed to collect issues during decryption and playback an automated issue classification and prioritization system is implemented.

In the present embodiment, the preset automatic issue classification algorithm is described in detail as follows: 1. Keyword extraction: keywords are extracted from user feedback using the TF-IDF algorithm. 2. Feature vector construction: keywords are converted into numerical features. 3. Classification using a machine learning model (such as Naive Bayes or SVM). In implementation, assume that user feedback is received: "audio playback suddenly stopped with error code E0023."

1. Keyword extraction: ["Playback stopped", "Error code", "E0023"]; 2. Conversion to feature vector: [1, 1, 1, 0, 0, . . . ]//assuming a predefined feature dictionary; 3. Classification using a trained model, such as categorizing it as "decryption failure."

Through the above detailed technical solution, the present embodiment of the present invention implements a computer-implemented method for adaptive decryption of audio streams. This solution not only addresses the challenges posed by platform-specific implementations, but also comprehensively optimizes performance, security, and scalability. By innovatively combining the general functions of the standard DRM interface with the requirements of specific platforms, this solution provides a robust and flexible solution for audio streaming services.

The core advantages of this solution include: 1. Adaptive decryption strategies that can accurately identify and process specific audio segments from different platforms. 2. Efficient parallel processing and smart caching mechanism that significantly improve decryption efficiency. 3. Strong security measures, including dynamic key management and code protection. 4. Excellent error handling and recovery mechanism to ensure service stability. 5. Good scalability and compatibility, supporting a plurality of audio formats and DRM schemes.

In addition, the modular design and comprehensive testing and verification process of this solution lay a solid foundation for future maintenance and upgrades. Through continuous monitoring and user feedback processing, the system can be continuously optimized and improved to adapt to changing market demands and technical environments.

In summary, this computer-implemented approach to adaptive decryption of audio streams represents a significant advancement in audio streaming DRM technology, opening up new possibilities for providing high-quality, secure, and flexible audio streaming services.

The present embodiment also provides a computer device including a memory, a processor, and a computer program stored on the memory and executable on the processor. When executed by the processor, the computer program performs the steps of the computer-implemented method for adaptive decryption of audio streams as described in any of the above.

The acquiring an MPEG-DASH manifest file and parsing the MPEG-DASH manifest file includes:

acquiring an MPD file from a server via an HTTP request, where the MPD file at least includes a Period element, an AdaptationSet element, and a SegmentTemplate element;

verifying whether a MIME type of the MPD file matches a preset MIME type; and after the verification and matching, traversing the Period element, AdaptationSet element, and SegmentTemplate element in the MPD file and parsing the elements to obtain the audio segment information, where the audio segment information includes duration, start time, initialization audio segment, and a URL template for media segment for each preset period.

The initializing a standard DRM interface and integrating same with a target audio stream platform includes:

loading the standard DRM interface module using a dynamic linking method;

initializing a context environment of the standard DRM interface and performing parameter configuration;

processing the encryption method of the target audio stream platform through a custom decryption callback function, and registering the callback function with the standard DRM interface; and configuring a key acquisition mechanism, where the configuration content includes trigger conditions for key requests and updates, namely, a validity period of the key, a content access count, or a user authorization status.

The configuring a key acquisition mechanism further includes:

creating a key request: $R=E(Kpub, [KID\|Nonce])$;

sending the request to a key server; and receiving and decrypting a response: $K=D(Kpriv, Response)$;

where R is an encrypted key request, K is a decryption key, E is a public key encryption function, D is a private key decryption function, Kpub is a server public key, Kpriv is a client private key, KID is a key ID, and Nonce is a nonce.

The performing feature extraction on the audio segment information in the identified audio segment mode, and dynamically adjusting segment requests and processing logic for adaptive segment downloading and preprocessing includes:

identifying, by parsing the MPD file to extract preset segment rules of audio segments, a non-standard timestamp format or a special segment numbering system, and achieving flexible regular expression matching to adapt to various non-standard URL modes;

dynamically constructing, based on the preset segment rules, a segment URL suitable for the target audio stream platform to achieve a customized URL template parser;

dynamically replacing, according to preset rules of the target audio stream platform, a variable in the URL to ensure that the generated URL meets the requirements of the target audio stream platform to successfully download an audio segment; and analyzing the downloaded audio segment, identifying natural segment points to adjust boundaries of the audio segment to ensure continuity and integrity of the audio stream, where the natural segment points include silence periods or audio feature changes.

The acquiring encryption information corresponding to the current audio segment, extracting encryption parameters to identify encryption flags of the target audio stream platform, and selecting, according to the encryption flags, corresponding decryption algorithms to decrypt the current audio segment includes:

acquiring a protection scheme sinf box information box of an MP4 file, and extracting encryption parameters, where the encryption parameters include a key, an initialization vector IV and an encryption flag or extension of the target audio stream platform;

using, based on a key storage mechanism, a trusted execution environment to protect the key from unauthorized access, and periodically updating, according to a key rotation strategy, a decryption key; and calling the decryption function of the standard DRM interface, and passing in the key and encrypted data for decryption processing.

The selecting corresponding decryption algorithms to decrypt the current audio segment according to the encryption flags further includes:

initializing, when the selected decryption algorithm is an AES-CTR decryption algorithm, a starting value of a counter;

encrypting a counter value using an AES algorithm and a key to generate a keystream, where the counter value is a combined value of an initialization vector IV and a current counter;

performing an XOR operation on each keystream block and a corresponding encrypted data block to obtain a decrypted data block; and repeating the above steps until all encrypted data blocks are decrypted, where the decryption formula is expressed as follows:

$$\text{Decrypted} = \text{Encrypted } XOR\ AES\text{-}CTR\ (\text{Key}, IV\|\text{Counter});$$

where Decrypted represents a result of a decryption operation, Encrypted is encrypted data, Key is a decryption key, IV is the initialization vector, and Counter is an incremented counter value.

The buffering, based on an adaptive buffering strategy, the updated audio stream in a preset buffer, and outputting a final audio stream includes:

allocating a memory of a fixed size as a first buffer;

configuring a write pointer for writing new data and a read pointer for playing the data;

resetting, when the corresponding pointer reaches an end of the first buffer, to a starting position to form a loop to enable a ring buffer to adaptively process continuous audio streams; and/or, creating a second buffer and a third buffer of the same size, where the second buffer is used for playing the current audio stream, and the third buffer is used for decrypting a next batch of audio streams; and immediately switching, when a playback of the second buffer is completed, to the decrypted third buffer for playback, starting decrypting a new audio stream in the second buffer that has just finished the playback at the same time to use the two buffers to alternately perform decryption and playback operations to achieve parallel processing;

where during the parallel processing, a mutex is used to protect read-write operations of the corresponding buffer, and a condition variable is used to notify relevant threads when a state of the corresponding buffer changes to ensure correct synchronization of the decryption and the playback; the first buffer, the second buffer, and the third buffer all dynamically adjust a number of pre-buffered segments according to an adaptive buffering strategy to achieve a corresponding buffer with a variable size to adapt to segment characteristics of different platforms.

The following is further included:

meeting, based on a multi-level optimization strategy, real-time playback requirements in high concurrency scenarios, the multi-level optimization strategy including:

processing decryption operations of a plurality of audio segments under a plurality of decryption threads in parallel via a thread pool, and balancing, based on a work-stealing algorithm, a load of each decryption thread;

predicting, according to a user's playback behavior prediction, downloading and decrypting subsequent audio segments in advance, and storing the audio segments in a preset buffer, optimizing, according to network conditions, loading of audio segments by adjusting a pre-fetching amount by means of an adaptive pre-fetching strategy; and/or, handling, based on a preset error handling strategy, abnormal situations occurring during the decryption process, the handling operations including:

retrying, based on an exponential backoff algorithm, when the network is abnormal;

adopting a degradation strategy when the network abnormality continues to exceed a fault threshold;

separately executing a retry mechanism on audio segments for which decryption has failed, and implementing a partial decryption strategy to allow playback to continue in the case of partial content decryption failure; and periodically saving, based on a checkpoint mechanism, a current decryption state as a checkpoint, and automatically restoring, when a system crash is detected, from a most recent checkpoint.

The following is further included:

preventing, based on a multi-level security strategy, illegal access, the multi-level security strategy including:

performing obfuscation operations on the current code using code obfuscation tools to increase difficulty of reverse engineering and virtualizing to protect key algorithms;

starting an integrity checking mechanism when decryption runs, the integrity checking mechanism including regularly calculating a hash value of key code modules and comparing a currently calculated hash value with an expected hash value to ensure code integrity and prevent code tampering; and dynamically generating, based on device characteristics and runtime environment, encryption keys through a key derivation function.

The dynamically generating, based on device characteristics and runtime environment, encryption keys through a key derivation function includes:

collecting device characteristics, the device characteristics including a CPU ID, a device ID, a hardware serial number, an installed software version, and a unique identifier associated with the device;

performing hash calculation on the device characteristics using a strong hash function to obtain a hash value with a fixed length, where the calculation formula is expressed as: $H=SHA256(F)$; and deriving, by an HMAC-based key derivation function, an encryption key K from the target parameters, denoted as $K=HKDF(H, salt, info)$;

where F represents a list of device characteristics, and the target parameters include a device characteristic hash value H, a random salt value salt, and application-specific information info.

The following is further included:

optimizing improvements in adaptability and compatibility, testing and verification, and deployment and maintenance, the optimizing operations include:

adding a new audio codec through a plugin-based architecture to achieve adaptation to a plurality of audio coding formats;

configuring a general DRM interface to integrate different DRM schemes to achieve automatic identification and switching mechanism of the DRM schemes; and/or generating preset mutated test cases using a fuzzing generator, comprehensively testing a URL parsing and audio segment processing logic, and promptly identifying abnormal issues; and/or collecting, based on a preset automatic issue classification algorithm, the abnormal issues that occur during the decryption and the playback to achieve automated issue classification and priority sorting.

The computer-implemented method for adaptive decryption of audio streams, the electronic device, and the computer program product of the storage medium provided in the present embodiment include a computer-readable storage medium storing program code. The instructions included in the program code can be used to execute the method in the foregoing method embodiment, and the specific implementation can refer to the method embodiment, which will not be repeated here.

A person skilled in the art can clearly understand that, for the convenience and conciseness of description, the specific working processes of the system and device described above can refer to the corresponding processes in the foregoing method embodiments, which will not be repeated here.

In addition, in the description of the present embodiment, unless otherwise clearly specified and defined, the terms "installation", "connected", and "connection" should be understood in a broad sense. For example, it can be a fixed connection, a detachable connection, or an integral connection; it can be a mechanical connection or an electrical connection; it can be a direct connection, an indirect connection through an intermediate medium, or an internal communication between two components. For a person skilled in the art, the specific meanings of the above terms in the present disclosure can be understood according to specific situations.

If a function is implemented in the form of a software functional unit and sold or used as an independent product, it can be stored in a computer-readable storage medium. Based on such an understanding, the essence of the technical solution of the present disclosure, or the part that contributes to the existing technology, or part of the technical solution can be embodied in the form of a software product. The computer software product is stored in a storage medium and includes several instructions to enable a computer device (which can be a personal computer, a server, or a network device, etc.) to execute all or part of the steps of the methods in the various embodiments of the present disclosure. The aforementioned storage media include: USB flash drives, portable hard drives, Read-Only Memory (ROM), Random Access Memory (RAM), magnetic disks, optical disks, and other media that can store program codes.

In the description of the present disclosure, it should be noted that the positional or directional relationships indicated by the terms "center", "upper", "lower", "left", "right", "vertical", "horizontal", "inner", and "outer" are based on the positional or directional relationships shown in the drawings. They are only for the convenience of describing the present disclosure and simplifying the description, and do not indicate or imply that the referred device or element must have a specific orientation, be constructed and operated in a specific orientation, and thus cannot be understood as a limitation on the present disclosure. In addition, the terms "first", "second", and "third" are only used for descriptive purposes and cannot be understood as indicating or implying relative importance.

The above descriptions and the above embodiments are only used to illustrate the technical solutions of the present invention, but not to limit them. Although the present invention has been described in detail with reference to the foregoing embodiments, a person skilled in the art should understand that they can still modify the technical solutions recorded in the foregoing embodiments, or equivalently replace some of the technical features therein; and these modifications or replacements do not cause the essence of the corresponding technical solutions to deviate from the spirit and scope of the technical solutions of the embodiments of the present invention.

What is claimed is:

1. A computer-implemented method for adaptive decryption of audio streams, comprising:

acquiring a Moving Picture Experts Group (MPEG)-Dynamic Adaptive Streaming over HyperText Transfer Protocol (DASH) manifest file and parsing the MPEG-DASH manifest file to extract audio segment information for adaptive segment recognition of standard and non-standard audio segment modes;

initializing a standard Digital Rights Management (DRM) interface and integrating the DRM interface with a target audio stream platform to adapt an MPEG-DASH protocol-based audio stream to an audio segment mode of the target audio stream platform;

performing feature extraction on the audio segment information in the identified audio segment mode, and dynamically adjusting segment requests and processing logic for adaptive segment downloading and preprocessing;

acquiring encryption information corresponding to a current audio segment, extracting encryption parameters to identify encryption flags of the target audio stream platform, and selecting, according to the encryption flags, corresponding decryption algorithms to decrypt the current audio segment; and performing audio frame reconstruction on the decrypted data to form an updated audio stream to ensure compatibility with an original unencrypted audio stream, and buffering, based on an adaptive buffering strategy, an updated audio stream in a preset buffer, and outputting a final audio stream to ensure audio stream continuity while achieving efficient parallel processing of decryption and playback.

2. The computer-implemented method for adaptive decryption of audio streams according to claim 1, wherein the acquiring the MPEG-DASH manifest file and parsing the MPEG-DASH manifest file comprises:

acquiring an MPD file from a server via an HTTP request, wherein the MPD file at least comprises a Period element, an AdaptationSet element, and a SegmentTemplate element;

verifying whether a MIME type of the MPD file matches a preset MIME type; and after the verification and matching, traversing the Period element, AdaptationSet element, and SegmentTemplate element in the MPD file and parsing the elements to obtain the audio segment information, wherein the audio segment information comprises duration, start time, initialization audio segment, and a URL template for media segment for each preset period.

3. The computer-implemented method for adaptive decryption of audio streams according to claim 1, wherein the initializing the standard DRM interface and integrating same with the target audio stream platform comprises:

loading a standard DRM interface module using a dynamic linking method;

initializing a context environment of the standard DRM interface and performing parameter configuration;

processing an encryption method of the target audio stream platform through a custom decryption callback function, and registering the custom decryption callback function with the standard DRM interface; and configuring a key acquisition mechanism, wherein a configuration content comprises trigger conditions for key requests and updates, namely, a validity period of the key, a content access count, or a user authorization status.

4. The computer-implemented method for adaptive decryption of audio streams according to claim 3, wherein the configuring the key acquisition mechanism further comprises:

creating a key request: $R=E(Kpub, [KID\|Nonce])$;

sending the request to a key server; and receiving and decrypting a response: $K=D(Kpriv, Response)$;

wherein R is an encrypted key request, K is a decryption key, E is a public key encryption function, D is a private key decryption function, Kpub is a server public key, Kpriv is a client private key, KID is a key ID, and Nonce is a nonce.

5. The computer-implemented method for adaptive decryption of audio streams according to claim 2, wherein the performing feature extraction on the audio segment information in the identified audio segment mode, and dynamically adjusting segment requests and processing logic for adaptive segment downloading and preprocessing comprises:

identifying, by parsing the MPD file to extract preset segment rules of audio segments, a non-standard timestamp format or a special segment numbering system, and achieving flexible regular expression matching to adapt to various non-standard URL modes;

dynamically constructing, based on the preset segment rules, a segment URL suitable for the target audio stream platform to achieve a customized URL template parser;

dynamically replacing, according to preset rules of the target audio stream platform, a variable in the URL to ensure that the generated URL meets the requirements of the target audio stream platform to successfully download an audio segment; and analyzing the downloaded audio segment, identifying natural segment points to adjust boundaries of the audio segment to ensure continuity and integrity of the audio stream, wherein the natural segment points comprise silence periods or audio feature changes.

6. The computer-implemented method for adaptive decryption of audio streams according to claim 1, wherein the acquiring encryption information corresponding to the current audio segment, extracting encryption parameters to identify encryption flags of the target audio stream platform, and selecting, according to the encryption flags, corresponding decryption algorithms to decrypt the current audio segment comprises:

acquiring a protection scheme sinf box information box of an MP4 file, and extracting encryption parameters, wherein the encryption parameters comprise a key, an initialization vector IV and an encryption flag or extension of the target audio stream platform;

using, based on a key storage mechanism, a trusted execution environment to protect the key from unauthorized access, and periodically updating, according to a key rotation strategy, a decryption key; and calling a decryption function of the standard DRM interface, and passing in the key and encrypted data for decryption processing.

7. The computer-implemented method for adaptive decryption of audio streams according to claim 1, wherein the selecting, according to the encryption flags, corresponding decryption algorithms to decrypt the current audio segment further comprises:

initializing, when the selected decryption algorithm is an AES-CTR decryption algorithm, a starting value of a counter;

encrypting a counter value using an AES algorithm and a key to generate a keystream, wherein the counter value is a combined value of an initialization vector IV and a current counter;

performing an XOR operation on each keystream block and a corresponding encrypted data block to obtain a decrypted data block; and repeating the above steps until all encrypted data blocks are decrypted, wherein the decryption formula is expressed as follows:

$$\text{Decrypted} = \text{Encrypted } XOR\ AES\text{-}CTR\ (\text{Key}, IV \| \text{Counter});$$

wherein Decrypted represents a result of a decryption operation, Encrypted is encrypted data, Key is a decryption key, IV is the initialization vector, and Counter is an incremented counter value.

8. The computer-implemented method for adaptive decryption of audio streams according to claim 1, wherein the buffering, based on the adaptive buffering strategy, the updated audio stream in the preset buffer, and outputting the final audio stream comprises:

allocating a memory of a fixed size as a first buffer;

configuring a write pointer for writing new data and a read pointer for playing the data;

resetting, when the corresponding pointer reaches an end of the first buffer, to a starting position to form a loop to enable a ring buffer to adaptively process continuous audio streams; and/or, creating a second buffer and a third buffer of the same size, wherein the second buffer is used for playing a current audio stream, and the third buffer is used for decrypting a next batch of audio streams; and immediately switching, when a playback of the second buffer is completed, to the decrypted third buffer for playback, starting decrypting a new audio stream in the second buffer that has just finished the playback at the same time to use the two buffers to alternately perform decryption and playback operations to achieve parallel processing;

wherein during the parallel processing, a mutex is used to protect read-write operations of the corresponding buffer, and a condition variable is used to notify relevant threads when a state of the corresponding buffer changes to ensure correct synchronization of the decryption and the playback; the first buffer, the second buffer, and the third buffer all dynamically adjust a number of pre-buffered segments according to an adaptive buffering strategy to achieve a corresponding buffer with a variable size to adapt to segment characteristics of different platforms.

9. The computer-implemented method for adaptive decryption of audio streams according to claim 1, further comprising:

meeting, based on a multi-level optimization strategy, real-time playback requirements in high concurrency scenarios, the multi-level optimization strategy comprising:

processing decryption operations of a plurality of audio segments under a plurality of decryption threads in parallel via a thread pool, and balancing, based on a work-stealing algorithm, a load of each decryption thread;

predicting, according to a user's playback behavior prediction, downloading and decrypting subsequent audio segments in advance, and storing the audio segments in a preset buffer, optimizing, according to network conditions, loading of audio segments by adjusting a pre-fetching amount by means of an adaptive pre-fetching strategy; and/or, handling, based on a preset error handling strategy, abnormal situations occurring during the decryption process, the handling operations comprising:

retrying, based on an exponential backoff algorithm, when the network is abnormal;

adopting a degradation strategy when the network abnormality continues to exceed a fault threshold;

separately executing a retry mechanism on audio segments for which decryption has failed, and implementing a partial decryption strategy to allow playback to continue in the case of partial content decryption failure; and periodically saving, based on a checkpoint mechanism, a current decryption state as a checkpoint, and automatically restoring, when a system crash is detected, from a most recent checkpoint.

10. The computer-implemented method for adaptive decryption of audio streams according to claim 1, further comprising:

preventing, based on a multi-level security strategy, illegal access, the multi-level security strategy comprising:

performing obfuscation operations on a current code using code obfuscation tools to increase difficulty of reverse engineering and virtualizing to protect key algorithms;

starting an integrity checking mechanism when decryption runs, the integrity checking mechanism comprising regularly calculating a hash value of key code modules and comparing a currently calculated hash value with an expected hash value to ensure code integrity and prevent code tampering; and dynamically generating, based on device characteristics and runtime environment, encryption keys through a key derivation function.

11. The computer-implemented method for adaptive decryption of audio streams according to claim 10, wherein the dynamically generating, based on device characteristics and runtime environment, encryption keys through the key derivation function comprises:

collecting device characteristics, the device characteristics comprising a CPU ID, a device ID, a hardware serial number, an installed software version, and a unique identifier associated with the device;

performing hash calculation on the device characteristics using a strong hash function to obtain a hash value with a fixed length, wherein the calculation formula is expressed as: $H = SHA256(F)$; and deriving, by an HMAC-based key derivation function, an encryption key K from the target parameters, denoted as $K = HKDF(H, \text{salt}, \text{info})$;

wherein F represents a list of device characteristics, and the target parameters comprise a device characteristic hash value H, a random salt value salt, and application-specific information info.

12. The computer-implemented method for adaptive decryption of audio streams according to claim 1, further comprising:

optimizing improvements in adaptability and compatibility, testing and verification, and deployment and maintenance, the optimizing operations comprise:

adding a new audio codec through a plugin-based architecture to achieve adaptation to a plurality of audio coding formats;

configuring a general DRM interface to integrate different DRM schemes to achieve automatic identification and switching mechanism of the DRM schemes; and/or generating preset mutated test cases using a fuzzing generator, comprehensively testing a URL parsing and audio segment processing logic, and promptly identifying abnormal issues; and/or collecting, based on a preset automatic issue classification algorithm, the abnormal issues that occur during the decryption and the playback to achieve automated issue classification and priority sorting.

13. A computer device, comprising a memory, a processor, and a computer program stored on the memory and executable on the processor, wherein when the computer program is executed by a processor, the computer implementing adaptive decryption of audio streams performs the following steps:

acquiring a Moving Picture Experts Group (MPEG)-Dynamic Adaptive Streaming over HyperText Transfer Protocol (DASH) manifest file and parsing the MPEG-DASH manifest file to extract audio segment information for adaptive segment recognition of standard and non-standard audio segment modes;

initializing a standard Digital Rights Management (DRM) interface and integrating the DRM interface with a target audio stream platform to adapt an MPEG-DASH protocol-based audio stream to an audio segment mode of the target audio stream platform;

performing feature extraction on the audio segment information in the identified audio segment mode, and dynamically adjusting segment requests and processing logic for adaptive segment downloading and preprocessing;

acquiring encryption information corresponding to a current audio segment, extracting encryption parameters to identify encryption flags of the target audio stream platform, and selecting, according to the encryption flags, corresponding decryption algorithms to decrypt the current audio segment; and performing audio frame reconstruction on the decrypted data to form an updated audio stream to ensure compatibility with an original unencrypted audio stream, and buffering, based on an adaptive buffering strategy, an updated audio stream in a preset buffer, and outputting a final audio stream to ensure audio stream continuity while achieving efficient parallel processing of decryption and playback.

14. The computer device according to claim 13, wherein the acquiring the MPEG-DASH manifest file and parsing the MPEG-DASH manifest file comprises:

acquiring an MPD file from a server via an HTTP request, wherein the MPD file at least comprises a Period element, an AdaptationSet element, and a SegmentTemplate element;

verifying whether a MIME type of the MPD file matches a preset MIME type; and after the verification and matching, traversing the Period element, AdaptationSet element, and SegmentTemplate element in the MPD file and parsing the elements to obtain the audio segment information, wherein the audio segment information comprises duration, start time, initialization audio segment, and a URL template for media segment for each preset period.

15. The computer device according to claim 13, wherein the initializing a standard DRM interface and integrating same with the target audio stream platform comprises:

loading a standard DRM interface module using a dynamic linking method;

initializing a context environment of the standard DRM interface and performing parameter configuration;

processing an encryption method of the target audio stream platform through a custom decryption callback function, and registering the custom decryption callback function with the standard DRM interface; and configuring a key acquisition mechanism, wherein a configuration content comprises trigger conditions for key requests and updates, namely, a validity period of the key, a content access count, or a user authorization status.

16. The computer device according to claim 13, wherein the acquiring encryption information corresponding to the current audio segment, extracting encryption parameters to identify encryption flags of the target audio stream platform, and selecting, according to the encryption flags, corresponding decryption algorithms to decrypt the current audio segment comprises:

acquiring a protection scheme sinf box information box of an MP4 file, and extracting encryption parameters, wherein the encryption parameters comprise a key, an initialization vector IV and an encryption flag or extension of the target audio stream platform;

using, based on a key storage mechanism, a trusted execution environment to protect the key from unauthorized access, and periodically updating, according to a key rotation strategy, a decryption key; and calling a decryption function of the standard DRM interface, and passing in the key and encrypted data for decryption processing.

17. The computer device according to claim 13, wherein the buffering, based on the adaptive buffering strategy, the updated audio stream in the preset buffer, and outputting the final audio stream comprises:

allocating a memory of a fixed size as a first buffer;

configuring a write pointer for writing new data and a read pointer for playing the data;

resetting, when the corresponding pointer reaches an end of the first buffer, to a starting position to form a loop to enable a ring buffer to adaptively process continuous audio streams; and/or, creating a second buffer and a third buffer of the same size, wherein the second buffer is used for playing a current audio stream, and the third buffer is used for decrypting a next batch of audio streams; and immediately switching, when a playback of the second buffer is completed, to the decrypted third buffer for playback, starting decrypting a new audio stream in the second buffer that has just finished the playback at the same time to use the two buffers to alternately perform decryption and playback operations to achieve parallel processing;

wherein during the parallel processing, a mutex is used to protect read-write operations of the corresponding buffer, and a condition variable is used to notify relevant threads when a state of the corresponding buffer changes to ensure correct synchronization of the decryption and the playback; the first buffer, the second buffer, and the third buffer all dynamically adjust a number of pre-buffered segments according to an adaptive buffering strategy to achieve a corresponding buffer with a variable size to adapt to segment characteristics of different platforms.

18. The computer device according to claim 13, further comprising:

meeting, based on a multi-level optimization strategy, real-time playback requirements in high concurrency scenarios, the multi-level optimization strategy comprising:

processing decryption operations of a plurality of audio segments under a plurality of decryption threads in parallel via a thread pool, and balancing, based on a work-stealing algorithm, a load of each decryption thread;

predicting, according to a user's playback behavior prediction, downloading and decrypting subsequent audio segments in advance, and storing the audio segments in a preset buffer, optimizing, according to network conditions, loading of audio segments by adjusting a pre-fetching amount by means of an adaptive pre-fetching strategy; and/or, handling, based on a preset error handling strategy, abnormal situations occurring during the decryption process, the handling operations comprising:

retrying, based on an exponential backoff algorithm, when the network is abnormal;

adopting a degradation strategy when the network abnormality continues to exceed a fault threshold;

separately executing a retry mechanism on audio segments for which decryption has failed, and implementing a partial decryption strategy to allow playback to continue in the case of partial content decryption failure; and periodically saving, based on a checkpoint mechanism, a current decryption state as a checkpoint, and automatically restoring, when a system crash is detected, from a most recent checkpoint.

19. The computer device according to claim 13, further comprising:

preventing, based on a multi-level security strategy, illegal access, the multi-level security strategy comprising:

performing obfuscation operations on a current code using code obfuscation tools to increase difficulty of reverse engineering and virtualizing to protect key algorithms;

starting an integrity checking mechanism when decryption runs, the integrity checking mechanism comprising regularly calculating a hash value of key code modules and comparing a currently calculated hash value with an expected hash value to ensure code integrity and prevent code tampering; and dynamically generating, based on device characteristics and runtime environment, encryption keys through a key derivation function.

20. A non-transitory computer-readable storage medium having stored thereon a computer program, wherein when the computer program is executed by a processor, the computer implementing adaptive decryption of audio streams performs the following steps:

acquiring a Moving Picture Experts Group (MPEG)-Dynamic Adaptive Streaming over HyperText Transfer Protocol (DASH) manifest file and parsing the MPEG-DASH manifest file to extract audio segment information for adaptive segment recognition of standard and non-standard audio segment modes;

initializing a standard Digital Rights Management (DRM) interface and integrating the DRM interface with a target audio stream platform to adapt an MPEG-DASH protocol-based audio stream to an audio segment mode of the target audio stream platform;

performing feature extraction on the audio segment information in the identified audio segment mode, and dynamically adjusting segment requests and processing logic for adaptive segment downloading and preprocessing;

acquiring encryption information corresponding to a current audio segment, extracting encryption parameters to identify encryption flags of the target audio stream platform, and selecting, according to the encryption flags, corresponding decryption algorithms to decrypt the current audio segment; and performing audio frame reconstruction on the decrypted data to form an updated audio stream to ensure compatibility with an original unencrypted audio stream, and buffering, based on an adaptive buffering strategy, an updated audio stream in a preset buffer, and outputting a final audio stream to ensure audio stream continuity while achieving efficient parallel processing of decryption and playback.

\* \* \* \* \*